(12) United States Patent
Okano

(10) Patent No.: US 11,644,354 B2
(45) Date of Patent: May 9, 2023

(54) FLOW RATE SENSOR CORRECTION DEVICE, FLOW RATE SENSOR, FLOW RATE CONTROL DEVICE, PROGRAM RECORDING MEDIUM ON WHICH IS RECORDED A PROGRAM FOR A CORRECTION DEVICE, AND CORRECTION METHOD

(71) Applicant: HORIBA STEC, Co., Ltd., Kyoto (JP)

(72) Inventor: Hiroyuki Okano, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 442 days.

(21) Appl. No.: 16/915,534

(22) Filed: Jun. 29, 2020

(65) Prior Publication Data

US 2021/0003438 A1    Jan. 7, 2021

(30) Foreign Application Priority Data

Jul. 2, 2019    (JP) .............................. JP2019-124029

(51) Int. Cl.
*G01F 1/696* (2006.01)
*G01F 1/69* (2006.01)

(52) U.S. Cl.
CPC .............. *G01F 1/6965* (2013.01); *G01F 1/69* (2013.01)

(58) Field of Classification Search
CPC ................................................... G01F 1/6965
USPC ....................................................... 73/204.18
See application file for complete search history.

(56) References Cited

U.S. PATENT DOCUMENTS

| 2002/0198668 A1* | 12/2002 | Lull | G05B 13/042 702/50 |
| 2014/0190270 A1* | 7/2014 | Suzuki | G01F 1/6965 73/861.03 |
| 2017/0167912 A1* | 6/2017 | Okano | G01F 1/68 |

FOREIGN PATENT DOCUMENTS

JP    2013134234 A    7/2013

\* cited by examiner

*Primary Examiner* — Walter L Lindsay, Jr.
*Assistant Examiner* — Philip T Fadul
(74) *Attorney, Agent, or Firm* — Alleman Hall Creasman & Tuttle LLP

(57) ABSTRACT

In order to provide a correction device that enables the accuracy of the linearity between sensor output values and flow rate values in a flow rate sensor, there are provided a sensitivity correction function storage unit that stores a sensitivity correction function in which at least a portion of sensitivity correction values are set to different values in accordance with the sensor output values output from a flow rate sensor in an initial state in which the sensitivity coefficient is set to an initial value, a sensitivity setting unit that sets the sensitivity coefficient based on the initial values and on the sensitivity correction function, and then adjusts the sensitivity of the flow rate sensor, and a coefficient calculation unit that calculates a post-correction flow rate characteristic function based on function correction values that are decided in accordance with the flow rate values output post sensitivity correction.

11 Claims, 7 Drawing Sheets

FLOW RATE SENSOR CORRECTION DEVICE, FLOW RATE SENSOR, FLOW RATE CONTROL DEVICE, PROGRAM RECORDING MEDIUM ON WHICH IS RECORDED A PROGRAM FOR A CORRECTION DEVICE, AND CORRECTION METHOD

TECHNICAL FIELD

The present invention relates to a correction device and the like for a flow rate sensor that is used to correct a flow rate characteristic function that converts a sensor output value x into a flow rate value y in a flow rate sensor.

TECHNICAL BACKGROUND

For example, a thermal flow rate sensor is formed so as to be able to measure a flow rate using the fact that a predetermined relationship exists between a flow rate and an amount of heat captured from an object. More specifically, two electrical resistance elements are provided on a flow path as a sensor mechanism, and voltage control thereof is performed such that the temperature of each electrical resistance element remains constant. Sensor output values x which have a predetermined relationship with the flow rate are then calculated from the respective voltage values at this time (see Patent Document 1).

Here, in order to convert the output values x from each sensor into flow rate values y, a flow rate characteristic function whose inputs are the sensor output values x and whose outputs are the flow rate values y is employed. These flow rate characteristic functions are affected by instrument differences between flow rate sensors, so that each flow rate characteristic function is specific to each individual flow rate sensor. Accordingly, if, for example, a standard flow rate characteristic function f(x) obtained by averaging the sensor characteristics of a plurality of flow rate sensors is used without being modified in any way, then an error is generated between a calculated flow rate value y and a flow rate value y of a fluid that is actually flowing. For this reason, a correction is made in order to bring the standard flow rate characteristic function f(x) closer to an actual flow rate characteristic function F(x) of an actual flow rate sensor.

For example, as is shown in FIG. 6(a), in the standard flow rate characteristic function f(x), linearity is essentially maintained between the zero point and the span point.

Next, as is shown in FIG. 6(b), the sensor output value x obtained when a standard gas such as $N_2$ or the like is supplied at a prescribed flow rate value to an actual flow rate sensor is measured as a sample value. For example, a span flow rate value obtained at the span point of the standard flow rate characteristic coefficient f(x) is set as the prescribed flow rate value. The aforementioned sample value is then input into the standard flow rate characteristic function f(x) and a calculated flow rate value is calculated. A function correction value n, which is obtained by dividing the prescribed flow rate value by the calculated flow rate value, is then multiplied by the standard flow rate characteristic function f(x), so that a final flow rate characteristic function h(x) having an adjusted gradient is calculated.

However, if a correction such as that described above is made when, as is shown in FIG. 6(c), the actual linearity of the actual flow rate characteristic function F(x) is poor, then the final flow rate characteristic function h(x) outputs a flow rate value y which is a smaller value than the actual flow rate value y between the zero point and the span point. In other words, flow rate errors are generated in all values except for the span flow rate values.

When the inventors of the present invention examined the causes of the poor linearity of the actual flow rate characteristic function F(x), they discovered that the following reasons existed. Namely, as is shown in FIG. 7(a), in a thermal flow rate sensor CM, in order to enable a fluid to flow through a thin pipe P in the sensor mechanism, a portion of the fluid is diverted from a bypass flow path BL by a diverting element DE. As is shown in FIG. 7(b), this diverting element DE is formed by stacking on top of each other in an axial direction thereof a plurality of thin circular plates DE2 in which multiple micro holes DE1 are formed. These micro holes DE1 are created by a processing method such as, for example, etching or the like, however, it is difficult to uniformize the size of all the holes, and unavoidably irregularities occur in the processing accuracy. Moreover, because a plurality of the thin circular plates DE2 are stacked on top of each other, if a combination of thin circular plates DE2 is selected with the intention of compensating for this irregular processing accuracy, then the flow rate sensor exhibits characteristics that are close to those obtained using the standard flow rate characteristics function f(x). On the other hand, if, by chance, a plurality of thin circular plates DE2 having poor processing accuracy are selected, then a sizeable non-linearity may be generated in the characteristics of the flow rate sensor CM.

If a thermal flow rate sensor having extremely poor characteristics is produced in this way, then even if corrections are made so as to bring the characteristics closer to those of the above-described conventional actual flow rate characteristic function F(x), it is still not possible to meet the accuracy criteria required, for example, in a thermal flow rate sensor. Because of this, if a diverting element DE having poor characteristics ends up being used, then the yield relating to flow rate adjustment deteriorates over the entire mass flow controller.

DOCUMENTS OF THE PRIOR ART

Patent Documents

Patent Document 1 Japanese Unexamined Patent Application (JP-A) No. 2013-134234

DISCLOSURE OF THE INVENTION

Problems to be Solved by the Invention

The present invention was conceived in consideration of the above-described problems, and it is an object thereof to provide a correction device that enables the accuracy of the linearity between sensor output values x and flow rate values y in an actual flow rate sensor to be improved, and enables a flow rate characteristic function to be corrected.

Means for Solving the Problem

A correction device according to the present invention is a correction device that corrects a flow rate characteristic function for a flow rate sensor that includes a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, wherein the correction device is provided with a sensitivity correction value function storage unit that stores a sensitivity correction value function m(x) in which at least a portion of sensitivity correction values m are set to different values in accordance with the sensor output values x output from the flow rate sensor in an initial state in which the sensitivity coefficient is set to an initial value, a sensitivity setting unit that sets the sensitivity coefficient based on the initial values and on the sensitivity correction value function m(x), and then adjusts the sensitivity of the flow rate sensor, a coefficient calculation unit that calculates a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x), and a function modification unit that stores either the post-correction flow rate characteristic function g(x) calculated by the function calculation unit or a final flow rate characteristic function h(x) that is based on this post-correction flow rate characteristic function g(x) in the function storage unit as a flow rate characteristic function.

In addition, a correction method according to the present invention is a correction method that is employed in order to correct a flow rate characteristic function for a flow rate sensor that includes a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, wherein the correction method incudes steps of storing a sensitivity correction value function m(x) in which at least a portion of sensitivity correction values m are set to different values in accordance with the sensor output values x output from the flow rate sensor in an initial state in which the sensitivity coefficient is set to an initial value, setting the sensitivity coefficient based on the initial values and on the sensitivity correction value function m(x), and then adjusting the sensitivity of the flow rate sensor, calculating a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x), and storing either the post-correction flow rate characteristic function g(x) calculated by the function calculation unit or a final flow rate characteristic function h(x) that is based on this post-correction flow rate characteristic function g(x) in the function storage unit as a flow rate characteristic function.

According to the above-described structure and method, if the linearity of the actual flow rate characteristic function F(x) of the flow rate sensor in an initial state in which the sensitivity coefficient has been set to an initial value is poor, then it is possible to change to a new post-sensitivity adjustment actual flow rate characteristic function G(x) that has good linearity based on the sensitivity correction value function m(x) in which at least a portion of the sensitivity correction values m have been set to different values in accordance with the sensor output values x. Because of this, the post-correction flow rate characteristic function g(x) can be matched substantially entirely with the post-sensitivity adjustment actual flow rate characteristic function G(x), and it becomes possible to prevent flow rate errors from being generated over the entire range of the sensor output values x.

Furthermore, because it is possible to set a different sensitivity coefficient for each sensor output value x by using the sensitivity correction value function m(x), it becomes possible to perform extremely precise sensitivity correction such as, for example, increasing the sensitivity correction value m in locations where errors are greater, and decreasing the sensitivity correction value m in locations where errors are smaller. Accordingly, in cases in which the sensitivity coefficient is corrected at a fixed ratio regardless of the sensor output values x, even if the flow rate sensor has characteristics that are unable to be corrected, it is still possible for the required accuracy criteria to be met. As a result, because a standard accuracy can be achieved by correcting the flow rate characteristic function, it is possible, for example, to improve the adjustment yield relating to flow rate characteristics in the overall flow rate control device in which this flow rate sensor is incorporated.

In a post-correction flow rate sensor in which the final flow rate characteristic function h(x) is stored, in order to improve the linearity of the post-sensitivity adjustment actual flow rate characteristic function G(x) and to enable it to match more easily with the post-correction flow rate characteristic function g(x), while at the same time ensuring that any output in which the sensor output values x or the flow rate values y substantially exceed a prescribed range is prevented from occurring, it is also possible for the sensitivity correction value function m(x) to be set such that the sensitivity correction values m become larger as the sensor output values x become smaller.

In order to make it possible to set the sensitivity correction value function m(x) such that it matches the characteristics for each pre-correction flow rate sensor based on actual measurement values, it is also possible for there to be further provided a sensitivity adjustment data storage unit that stores a plurality of sets of data for sensitivity adjustment that are made up of sensitivity reference flow rate values F1 for the flow rate of a fluid actually flowing through the flow path, sensor outputs x that are output from the flow rate sensor in an initial state that corresponds to the sensitivity reference flow rate values F1, and pre-sensitivity adjustment flow rate values S1 which are flow rate values y output from the flow rate sensor in the initial state that corresponds to the sensitivity reference flow rate values F1, and a correction function output unit that, based on the plurality of sets of data for sensitivity adjustment, calculates sensitivity correction values m that correspond to each sensor output x in accordance with a difference between the sensitivity reference flow rate values F1 and the flow rate values y, and calculates the sensitivity correction value function m(x) from the plurality of sets of sensor outputs x and sensitivity correction values m, and causes these to be stored in the sensitivity correction value function storage unit.

In order to cause the post-correction flow rate characteristic function g(x) to match the post-sensitivity adjustment actual flow rate characteristic function G(x) over the entire range of the sensor output values x, it is also possible for there to be further provided a span adjustment data storage unit that stores data for span adjustment that is made up of span reference flow rate values F2 for the flow rate of a fluid actually flowing through the flow path, and the flow rate values y output from the flow rate sensor whose sensitivity has been corrected using the sensitivity correction value function m(x), and for the function calculation unit to be formed so as to calculate the post-correction flow rate characteristic function g(x), based on the span adjustment data, by taking a value obtained by dividing the span reference flow rate values F2 by the flow rate values y as the function correction value n, and then multiplying this by the standard flow rate characteristic function f(x).

In order to enable span flow rate values, which are the most important flow rate values y, to be output without any errors from the flow rate sensor, and to thereby improve reliability, it is also possible for the span reference flow rate values F2 to be values for the span of the flow rate values y that are set in the flow rate sensor.

When the inventors of the present specification performed intensive investigations, they were able to discover for the first time ever that a correlation existed between the size of the measurement errors that were generated by the type of fluid flowing through the flow path and the sensitivity correction values m. In order to make it possible to also correct errors caused by variations in the type of gas that were individually generated as a result of sensitivity correction being performed in this way, it is also possible for the function modification unit to include a gas-type correction value calculation unit that calculates a gas-type correction coefficient k based on a thermal conductivity λ of a fluid, and on the sensitivity correction values m in predetermined sensor output values x, and a final output unit that calculates the final flow rate characteristic function h(x) by multiplying the gas-type correction coefficient k by the post-correction flow rate characteristic function g(x), and then stores this final flow rate characteristic function h(x) in the function storage unit.

A specific aspect of the present invention that, in order to make it possible to calculate a correction caused by variations in the gas type from known values while omitting the tasks of having to actually supply the fluid to an individual flow rate sensor, and obtain measurement values, and then acquire the gas-type correction coefficient k, is one in which the gas-type correction value calculation unit calculates a gradient a(m) which is a function of the sensitivity correction values m in predetermined sensor output values x, and then calculates the gas-type correction coefficient k based on the following formula:

$$k=a(m)\times(1/\lambda)-(1/2)+b$$

wherein λ is a thermal conductivity of a fluid flowing through the flow path, and b is a predetermined intercept.

Provided that a flow rate sensor that is formed so as to output flow rate values y based on the final flow rate characteristic function h(x) stored by the correction device according to the present invention is employed, then it is possible to reduce flow rate errors over the entire range of sensor output values x, and to output accurate flow rate values y. As a result, it is possible, for example, to improve the adjustment yield relating to flow rate characteristics in the overall flow rate control device in which this flow rate sensor is incorporated.

Provided that a flow rate control device that is provided with the flow rate sensor according to the present invention is employed, then it is possible to maintain the flow rate control accuracy within the range of sensor output values x at an extremely high level.

In order to make it possible to enjoy the same effects as those obtained from the correction device according to the present invention by updating a program that is used in an existing correction device, it is also possible to employ a program for a correction device that corrects a flow rate characteristic function for a flow rate sensor that includes a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, and for this program for a correction device to cause a computer to function as a sensitivity correction value function storage unit that stores a sensitivity correction value function m(x) in which at least a portion of sensitivity correction values m are set to different values in accordance with the sensor output values x output from the flow rate sensor in an initial state in which the sensitivity coefficient is set to an initial value, a sensitivity setting unit that sets the sensitivity coefficient based on the initial values and on the sensitivity correction value function m(x), and then adjusts the sensitivity of the flow rate sensor, a coefficient calculation unit that calculates a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x), and a function modification unit that stores either the post-correction flow rate characteristic function g(x) calculated by the function calculation unit or a final flow rate characteristic function h(x) that is based on this post-correction flow rate characteristic function g(x) in the function storage unit as a flow rate characteristic function.

Note that the program for a correction device may be able to be delivered electronically, or may be recorded on a program recording medium such as a CD, DVD, HDD, or flash memory or the like.

Effects of the Invention

In this way, according to the correction device for a flow rate sensor according to the present invention, it is possible, for example, to perform extremely precise sensitivity adjustment of each sensor flow rate value x for an actual flow rate characteristic function F(x) having poor linearity in an initial state using the sensitivity correction value function m(x). As a result, because it is possible to change to a new post-sensitivity adjustment actual flow rate characteristic function G(x) that has extremely good linearity, and to match the post-correction flow rate characteristic function g(x) with this post-sensitivity adjustment actual flow rate characteristic function G(x) based on the standard flow rate characteristics function f(x) and on the function correction values n, it is possible to reduce flow rate errors over substantially the entire range of sensor output values x. In addition, by using the sensitivity correction value coefficient m(x), it becomes possible to make corrections even for flow rate sensors in which, conventionally, correction has not been possible, and, for example, to improve the adjustment yield relating to flow rate characteristics in the overall flow rate control device in which this flow rate sensor is incorporated.

BEST EMBODIMENTS FOR IMPLEMENTING THE INVENTION

An embodiment of the present invention will now be described with reference to the drawings.

Figure 1:
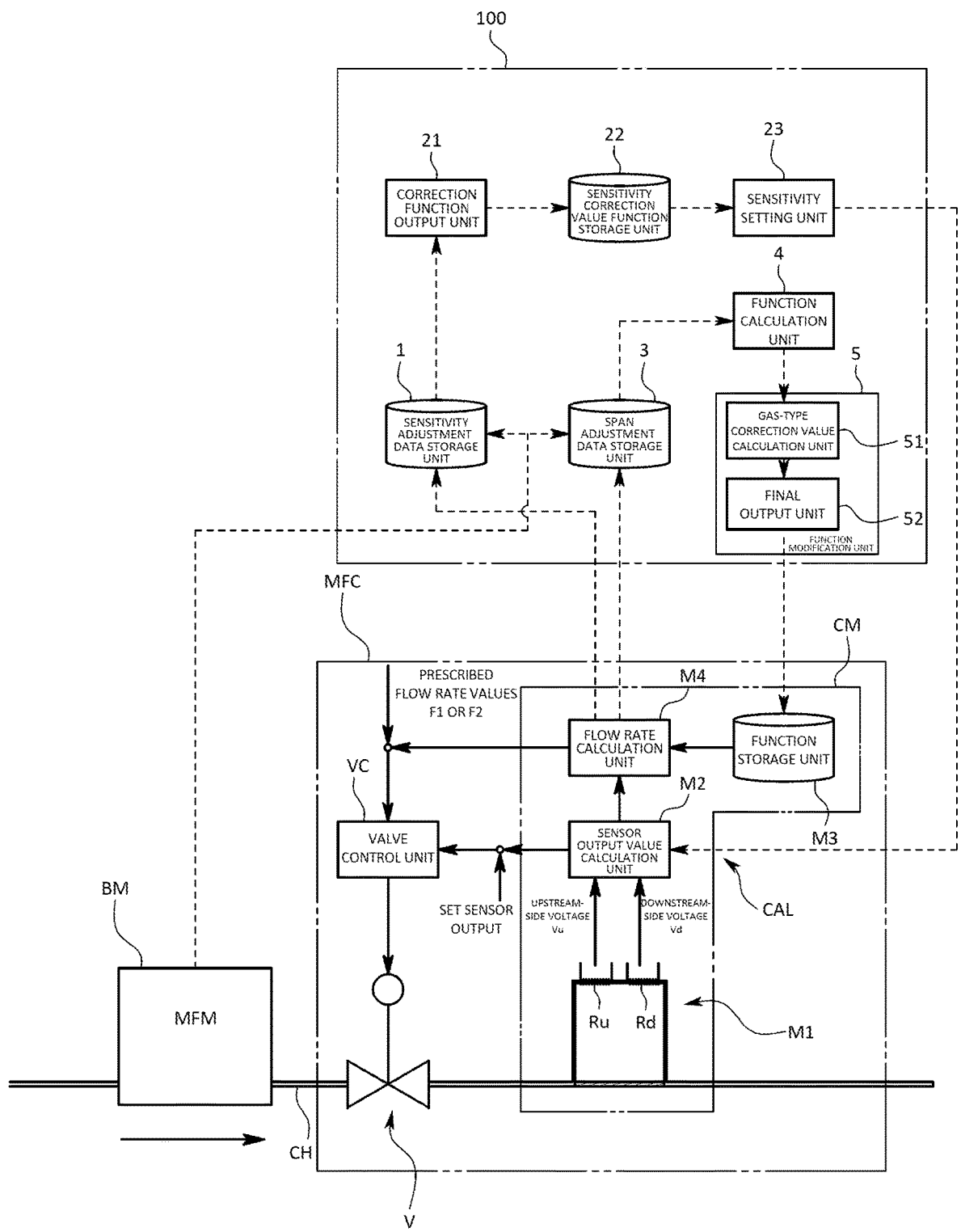
FIG. 1 is a schematic view showing a correction device according to an embodiment of the present invention.

As is shown in FIG. 1, a flow rate correction device 100 of the present embodiment is used in order to make corrections so as to reduce flow rate errors over an entire range of sensor output values x by reflecting instrument differences at the time of shipment from the factory of, for example, thermal flow rate sensors.

Here, the thermal flow rate sensor that is subject to correction forms part of a thermal mass flow controller MFC. In other words, as is shown in FIG. 1, the mass flow controller MFC is provided with a valve V that is provided on a flow path CH, a flow rate sensor CM that measures a flow rate inside the flow path, and a valve control unit VC that controls an aperture of the valve V based on outputs from the flow rate sensor CM. These instruments are packaged together in a single housing.

The flow rate sensor CM to be corrected will now be described in detail.

As is shown in FIG. 1, this flow rate sensor CM is formed by a sensor mechanism M1 that outputs output signals in accordance with a flow rate of a fluid flowing through the flow path CH, and a calculation unit CAL that calculates the flow rate of the fluid based on the outputs from the sensor mechanism M1.

The sensor mechanism M1 is formed by a narrow U-shaped pipe that is provided so as to branch off from the flow path along which the fluid is flowing and then rejoin this flow path further downstream, and by a pair of electrical resistance wires Ru and Rd that are wrapped around the narrow pipe. Each of the electrical resistance wires Ru and Rd is connected to a constant temperature circuit (not shown in the drawings) in order that the temperatures thereof remain constant. Because heat is carried by the fluid flowing through the interior of the narrow pipe from the electrical resistance wire Ru on the upstream side to the electrical resistance wire Rd on the downstream side, the upstream-side voltage that is applied to the electrical resistance wire Ru on the upstream side has a higher value than the downstream-side voltage that is applied to the electrical resistance wire Rd on the downstream side. Because the difference between the upstream-side voltage and the downstream-side voltage is in a predetermined relationship with the flow rate of the fluid, the flow rate is calculated in the calculation unit CAL based on the values thereof. In the present embodiment, the sensor mechanism M1 is formed so as to output an output signal that shows a calculation value F1 such as that shown below based on the upstream-side voltage and the downstream-side voltage.

$$FI=(Vu-Vd)/(Vu+Vd)$$

Here, F1 is a value showing the output signal from the sensor mechanism M1, Vu is the upstream-side voltage, and Vd is the downstream-side voltage.

The calculation unit CAL is a computer that includes, for example, a CPU, memory, an A/D converter, and a D/A converter and the like. As a result of a flow rate calculation program that is stored in the memory being executed, the calculation unit CAL is able to function at least as a sensor output calculation unit M2, a function storage unit M3, and a flow rate calculation unit M4 in collaboration with various other instruments.

The sensor output calculation unit M2 calculates sensor output values x based on values indicated by the output signals output by the sensor mechanism M1, and on a preset sensitivity coefficient. More specifically, the sensor output calculation unit M2 is formed so as multiply a preset sensitivity coefficient amp by the value F1 indicated by the output signal from the sensor mechanism M1. Note that the initial value of the sensitivity coefficient amp is set to (100%). Note also that the initial value referred to here is a value that is provisionally set in the flow rate sensor CM in a state prior to any flow rate errors of the flow rate sensor CM being corrected by the flow rate correction device 100 of the present embodiment.

In other words, the sensor output unit M2 performs the following type of calculation.

$$x=FI \times amp$$

Here, x is the sensor output value, F1 is a value indicated by the output signal from the sensor mechanism M1, and amp is the sensitivity coefficient. In this embodiment, a structure is employed in which amp is not a fixed value, but instead amp can be set to a value that varies in accordance with the sensor output x which is set to 1 in the initial state, in other words, in accordance with the value of FI.

The function storage unit M3 stores a predetermined flow rate characteristic function whose inputs are the sensor output values x, and whose outputs are the current values y. Note that, in the present embodiment, a standard flow rate characteristic function f(x) is stored in the function storage unit M3 as a default flow rate characteristic function. This standard flow rate characteristic function f(x) is obtained by averaging the flow rate characteristic functions that were respectively created by actually measuring the relationships between the sensor output values x and the flow rate values y in a plurality of flow rate sensors that each have the same structure as the thermal flow rate sensor to be corrected. In other words, the standard flow rate characteristic function f(x) is obtained by averaging instrument errors that are generated unexpectedly in each of the thermal flow rate sensors.

The flow rate calculation unit M4 is formed so as to calculate the flow rate values y based on the sensor output values x calculated by the sensor output calculation unit M2, and on the flow rate characteristic function stored at that point in time in the function storage unit M3.

Next, the flow rate control of the mass flow controller MFC performed by the valve control unit VC will be described.

The valve control unit VC is formed so as to be able to switch between performing either of two types of feedback control. In other words, the valve control unit VC is able to execute both sensor output value control using the sensor output values x for feedback, and flow rate value control using the flow rate values y for feedback. The sensor output value control is a control mode that is mainly used in order to obtain the values necessary for performing corrections using the correction device 100. In this mode, the aperture of the valve V is controlled such that a deviation between a target sensor output value x that has been supplied as a target value, and the sensor output values x output from the sensor output calculation unit M2 is reduced. In contrast, the flow rate value control is a control mode that is mainly used in order to perform actual flow rate control. In this mode, the aperture of the valve V is controlled such that a deviation between a flow rate value that has been supplied as a target value, and the flow rate value output from the flow rate calculation unit M4 is reduced.

Moreover, when correction of the thermal flow rate sensor CM that is to be corrected is to be performed by the correction device 100, a reference flow rate sensor BM that provides a reference is disposed on the upstream side or the downstream side of the mass flow controller MFC. The reference flow rate sensor BM is, for example, a pressure flow rate sensor, and output values from this reference flow rate sensor BM are guaranteed to a predetermined accuracy. In other words, the correction device 100 is formed so as to correct the thermal flow rate sensor CM that is to be corrected based on the sensor output values x and the flow rate values y that are output from the thermal flow rate sensor CM that is to be corrected, and on the flow rate values y shown by the reference flow rate sensor BM that provides a reference.

Next, the correction device 100 will be described in greater detail. In the following description, a flow rate characteristic function that is initially set as a numerical formula in the function storage unit M3 in the flow rate sensor CM that is to be corrected is described as the standard flow rate characteristic function f(x), and a distinction is made between this and either the actual flow rate characteristic function F(x) prior to the sensitivity adjustment, which is the actual flow rate characteristic function originally provided in the flow rate sensor CM to be corrected, or the actual flow rate characteristic function G(x) after the sensitivity adjustment. Note that both the actual flow rate characteristic function F(x) prior to the sensitivity adjustment and the actual flow rate characteristic function G(x) after the sensitivity adjustment are unknown functions, and reflect instrument differences in each flow rate sensor CM being adjusted. The object of the correction performed by this correction device 100 is to bring the standard flow rate characteristic function f(x) set in the flow rate sensor CM to be corrected closer to the post-sensitivity adjustment actual flow rate characteristic function G(x). This correction of the present embodiment is achieved by, firstly, improving the linearity of the actual flow rate characteristic function F(x) by altering the sensitivity coefficient that has been set in the sensor output calculation unit M2. Thereafter, corrections are made so that the standard flow rate characteristic function f(x) matches the post-sensitivity adjustment actual flow rate characteristic function G(x).

More specifically, the functions of the correction device 100 are achieved as a result of a program for a correction device that is stored in the memory of a computer that includes, for example, a CPU, memory, and input/output devices and the like being executed so that the various instruments are able to operate in mutual collaboration.

In other words, the correction device 100 performs the functions of at least a sensitivity adjustment data storage unit 1, a correction function output unit 21, a sensitivity correction value function storage unit 22, a sensitivity setting unit 23, a span adjustment data storage unit 3, a function calculation unit 4, and a function modification unit 5.

Each of these units as well as the correction method employed by the correction device 100 will now be described in detail. Note that the fluid that is flowing through the flow path when the flow rate values y are obtained from the flow rate sensor CM being corrected in order for the correction to be performed is, for example, a standard gas such as nitrogen gas.

Figure 2A:
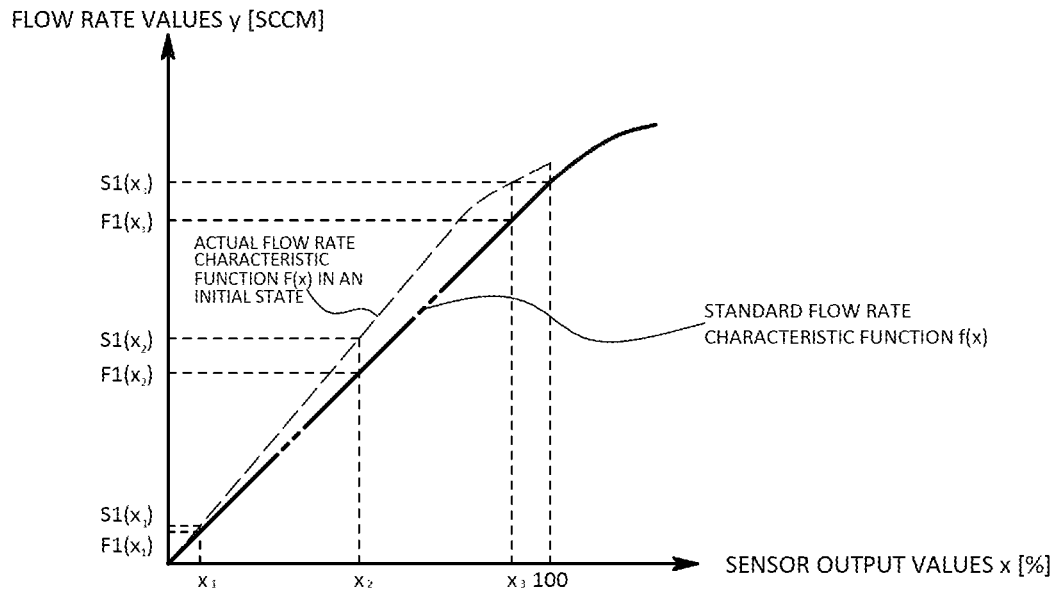
FIGS. 2(a) and 2(b) show graphs which show sensitivity adjustment results in the same embodiment.

Moreover, it is assumed that, as is shown in FIG. 2(a), the standard flow rate characteristic function f(x) is a function in which the linearity is substantially secured within the range of the sensor output values x.

There are cases in which the linearity of the actual flow rate characteristic function F(x) in the initial state is poor relative to this standard flow rate characteristic function f(x), and this may result, for example, in the flow rate values y that correspond to the respective sensor output values x becoming larger. Hereinafter, a description is given based on a case in which the actual flow rate characteristic function F(x) in the initial state is a function that protrudes onto the upper side relative to the standard flow rate characteristic function f(x).

Firstly, the mass flow controller MFC is operated using feedback control of the sensor output values x, and flow rate control is performed so that target sensor output values are output from the flow rate sensor CM to be corrected which is in its initial state. Here, flow rate control is performed such that a plurality of sensor output values x, namely, $x_1$, $x_2$, and $x_3$, are obtained for the span as the target sensor flow rate values y. At this time, the respective flow rate values of the fluid actually flowing through the flow path CH are measured by the reference flow rate sensor BM, and are stored in the sensitivity adjustment data storage unit 1 as sensitivity reference flow rate values F1 (F1(×1), F1(×2), and F1(×3)). In addition, the flow rate values y output from the flow rate sensor CM to be corrected when the fluid is flowing through the flow path CH at the respective sensitivity reference flow rate values F1 (F1(×1), F1(×2), F1(×3)) are also stored in the sensitivity adjustment data storage unit 1 as pre-sensitivity adjustment flow rate values S1 (S1(×1), S1(×2), and S1(×3)). More specifically, the sensitivity adjustment data storage unit 1 stores a plurality of sets of sensitivity adjustment data. These sets of sensitivity adjustment data are formed by combining the output values x and the pre-sensitivity adjustment flow rate values S1 obtained from the flow rate sensor CM with the sensitivity reference flow rate values F1 obtained from the reference flow rate sensor BM.

In other words, as is shown in FIG. 2 (a), a plurality of points on the pre-sensitivity adjustment actual flow rate characteristic function F(x), and values measured for the corresponding plurality of points on the standard flow rate characteristic function f(x) are stored in the sensitivity adjustment data storage unit 1.

The sensitivity setting unit 23 sets the sensitivity coefficient in the flow rate sensor CM to be corrected to a state obtained by multiplying the sensitivity correction values m by the initial value, and then adjusts the sensitivity of the flow rate sensor CM. In this embodiment, the sensitivity setting unit 23 sets the sensitivity coefficient to a state in which the respective mutually different sensitivity correction values m are multiplied in accordance with the sensor output values x.

Figure 3:
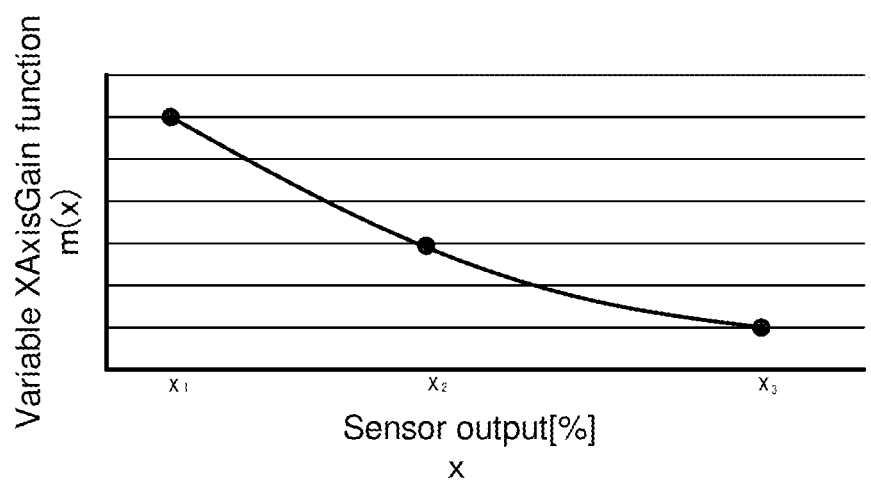
FIG. 3 is a graph showing an example of a sensitivity correction value function m(x) in a sensitivity adjustment step in the same embodiment.

More specifically, the correction function output unit 21 calculates the sensitivity correction values m in accordance with the difference between the sensitivity reference flow rate values F1 and the pre-sensitivity adjustment flow rate values S1 for each set of sensitivity adjustment data. For example, as this difference becomes greater, the value of the sensitivity correction value m that is calculated also becomes greater. The relationships between this difference and the sensitivity correction values m are determined, for example, by experiment. In this embodiment, as is shown in the graph in FIG. 3, the sensitivity correction value function m(x) is calculated via linear interpolation using quadratic functions based on three sensitivity correction values m that have been calculated so as to correspond to three sensor output values x. The correction function output unit 21 stores the calculated sensitivity correction value function m(x) in the sensitivity correction value function storage unit 22. The sensitivity setting unit 23 uses this sensitivity correction value function m(x) to alter the sensitivity coefficient of the flow rate sensor CM being corrected so that the sensitivity correction values m are multiplied in accordance with the respective sensor outputs x.

Figure 2B:
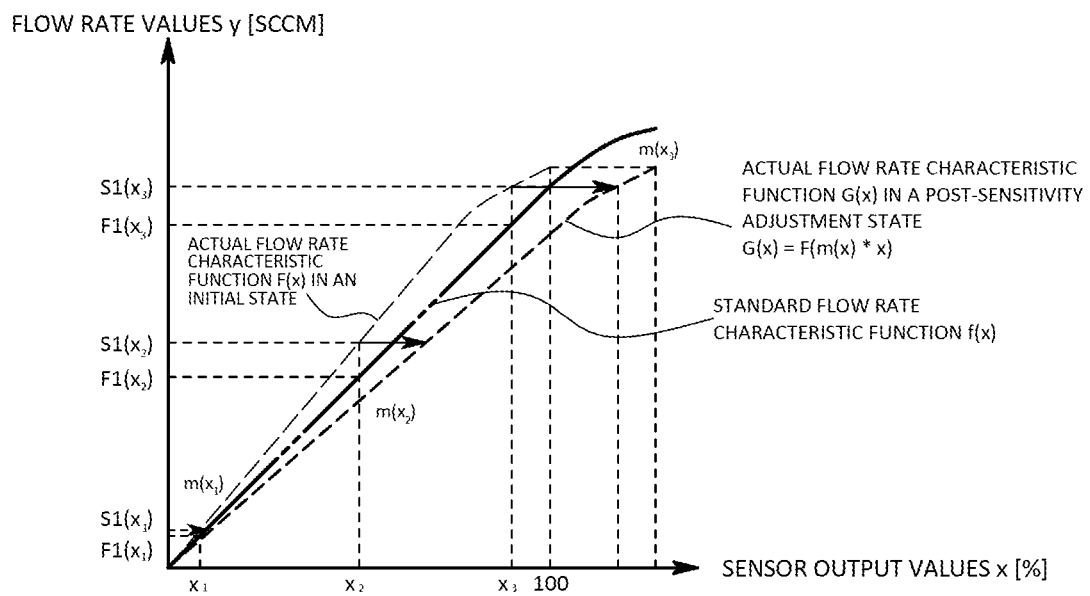

As is shown in FIG. 2(b), the actual flow rate characteristic function F(x) in the initial state is changed in the axial direction of the sensor output values to the actual flow rate characteristic function G(x) in a post-sensitivity adjustment state that has been multiplied m(x) number of times corresponding to the number of sensor output values x.

In this example, the actual flow rate characteristic function F(x) in the initial state which has poor linearity is enlarged in the axial direction of the sensor output values, and there is a reduced amount of increase in the flow rate values y per unit sensor output value x. Here, because the respective sensitivity correction values m that correspond to the respective sensor output values x are set independently, the post-sensitivity adjustment actual flow rate characteristic function G(x) has improved linearity compared to the actual flow rate characteristic function F(x) in the initial state. In contrast, even if the sensitivity coefficient of the standard flow rate characteristic function f(x) is altered, there is no change on the shape of the graph thereof, and this graph maintains its original shape. Accordingly, the linearity of the post-sensitivity adjustment actual flow rate characteristic function G(x) becomes substantially the same as the linearity of the standard flow rate characteristic function f(x) due to the sensitivity correction value function m(x).

Next, the correction procedure for the flow rate sensor CM to be corrected when this is in a post-sensitivity adjustment state will be described further.

Figure 4A:
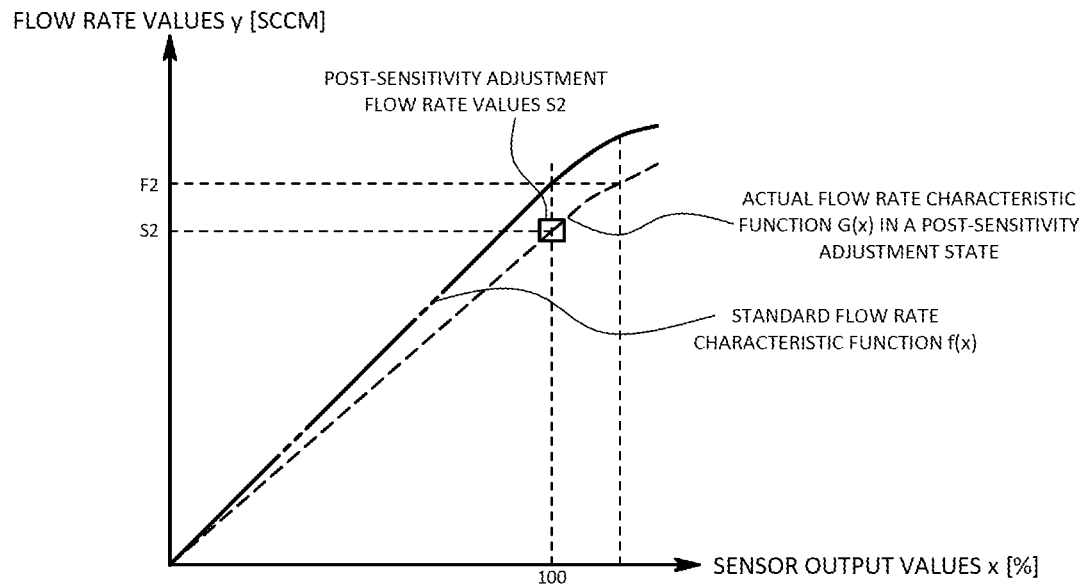
FIGS. 4(a) and 4(b) show graphs which show function correction results in the same embodiment.

As is shown in FIG. 4(a), next, flow rate control is performed by the post-sensitivity adjustment mass flow controller MFC such that the sensor output values x are 100%, and span reference flow rate values F2, which show the flow rate measured by the reference flow rate sensor BM at that time, and post-sensitivity adjustment flow rate values S2, which show the flow rate values y output from the flow rate sensor CM being corrected in this post-sensitivity adjustment state are stored in the span adjustment data storage unit 3. Using these two flow rate values, enlargement and reduction in the y axial direction are performed for the standard flow rate characteristic function f(x). In other words, span correction is performed such that the standard flow rate characteristic function f(x) substantially matches the actual flow rate characteristic function G(x) in a post-sensitivity adjustment state within the range of the sensor output values x.

Figure 4B:
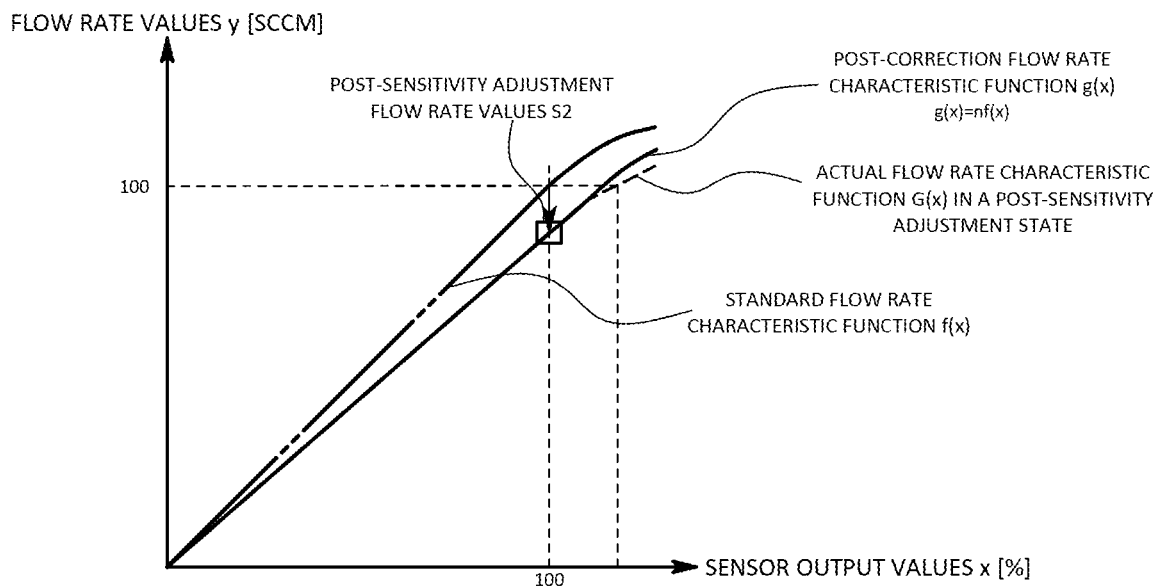

More specifically, the coefficient calculation unit 4 calculates the post-correction flow rate characteristic function g(x) obtained by multiplying a function correction value n by the standard flow rate characteristic function f(x). Here, the function correction values n are values obtained by dividing the span reference flow rate values F2 by the post-sensitivity adjustment flow rate values S2. As is shown in FIG. 4 (b), the post-correction flow rate characteristic function g(x) that is calculated in this way substantially matches the actual flow rate characteristic function F(x) in a post-sensitivity adjustment state in the sensor output values x between 0~100%. When the nitrogen gas that is used for the correction is flowing through the flow path, the post-correction flow rate characteristic function g(x) that is calculated in this way is able to reduce flow rate errors over the entire range of the sensor output values x. Note that the function correction values n are not restricted to being calculated based on the flow rate value y at the time when the sensor output value x is 100%, and it is also possible for a function correction value n to be decided based on the flow rate value y when the sensor output value x is some other value such as, for example, 80%. In addition, for the function correction values n and the sensitivity correction value function m(x) determined in the manner described above, the same values can also be used not just when calculating the flow rate of the nitrogen gas actually supplied to the flow path in order for the correction to be made, but also when calculating the flow rate of other types of fluids.

Lastly, the function modification unit 5 stores the calculated post-correction flow rate characteristic function g(x) or a final flow rate characteristic function h(x) that is based on this post-correction flow rate characteristic function g(x) in the function storage unit M3 of the flow rate senor CM as the flow rate characteristic function. In the present embodiment, the function modification unit 5 stores the post-correction flow rate characteristic function g(x) as the flow rate characteristic function that is used when nitrogen gas, which is a standard gas, is being supplied.

In contrast, when a gas which is different from the nitrogen gas that is used as a standard gas in the above-described correction method is supplied to the flow path CH, the post-correction flow rate characteristic function g(x) that has been calculated based on the standard gas does not completely match the actual flow rate characteristic function F(x) in a post-sensitivity adjustment state, and flow rate errors are generated.

Therefore, a structure is employed in which the function modification unit 5 causes the final flow rate characteristic function h(x) in which flow rate errors caused by the gas type that are generated when setting the post-correction flow rate characteristic function g(x) have been corrected to be stored in the function storage unit M3.

More specifically, the function modification unit 5 is provided with a gas-type correction value calculation unit 51 that calculates a gas-type correction coefficient k based on a thermal conductivity $\lambda$ of a fluid, and on the sensitivity correction values m in predetermined sensor output values x, and a final output unit 52 that calculates the final flow rate characteristic function h(x) by multiplying the gas-type correction coefficient k by the post-correction flow rate characteristic function g(x), and then stores this final flow rate characteristic function h(x) in the function storage unit M3.

Figure 5A:
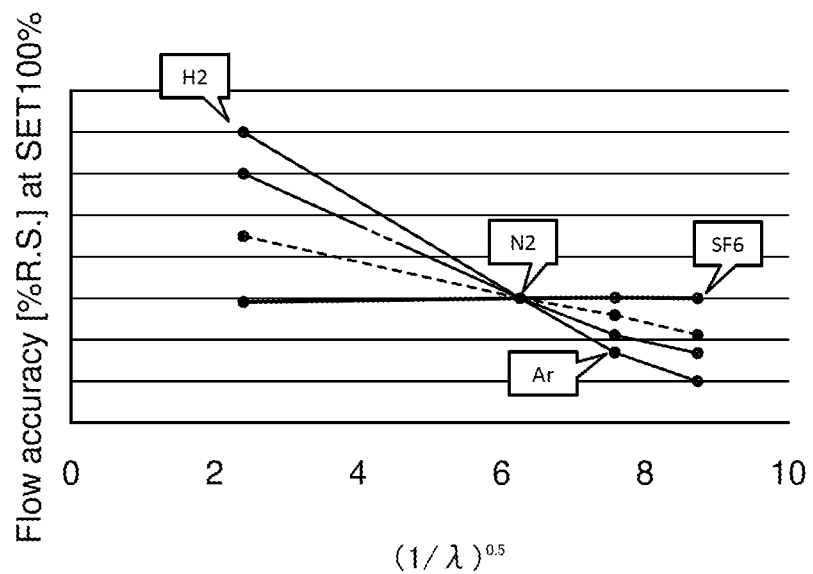
FIGS. 5(a) and 5(b) show graphs which show relationships between gas types, flow rate errors, and sensitivity correction values m in the same embodiment.
Figure 5B:
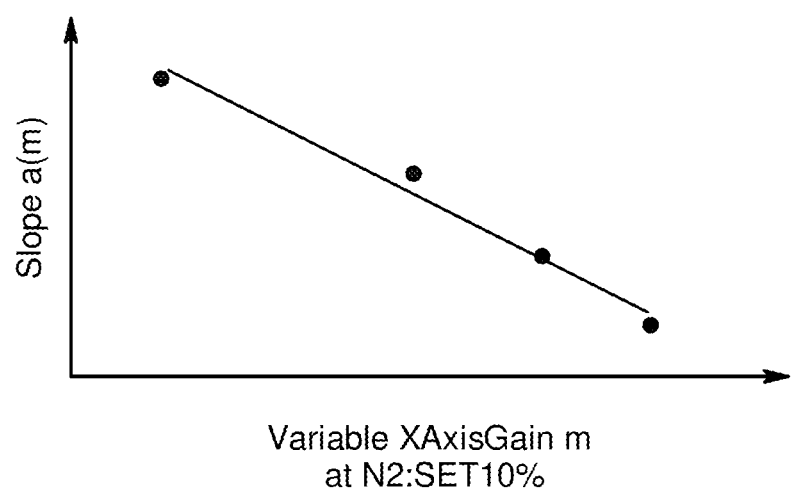
Figure 6A:
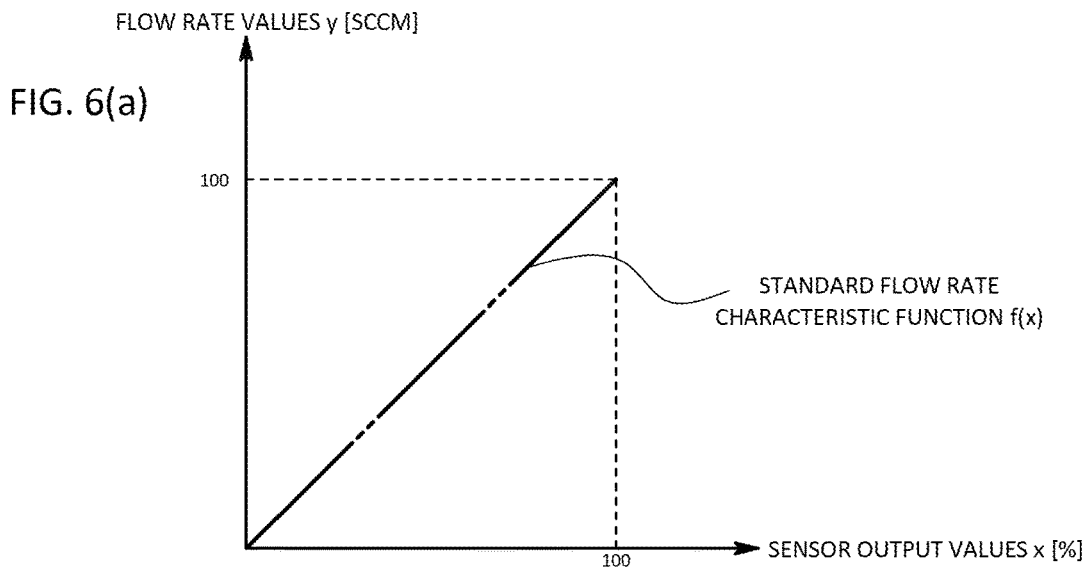
FIGS. 6(a)-6(c) show graphs relating to a conventional correction method.
Figure 6B:
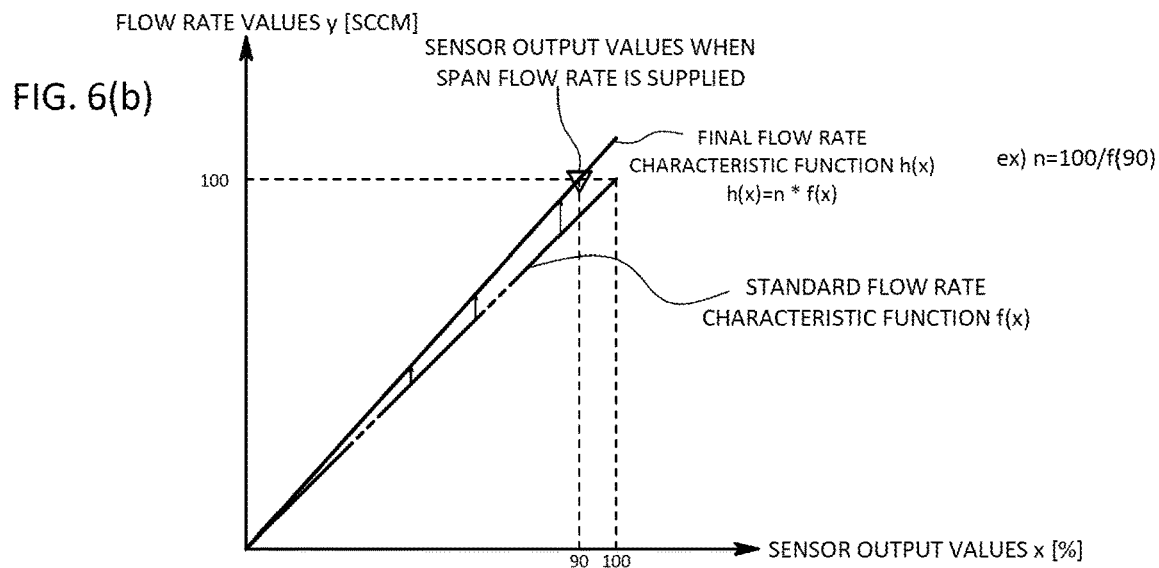
Figure 6C:
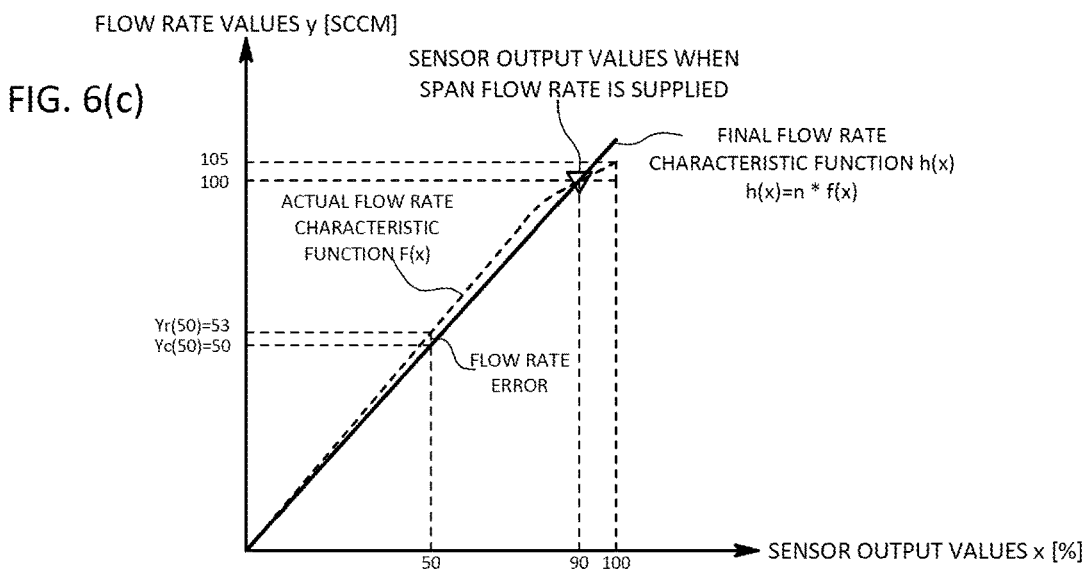
Figure 7A:
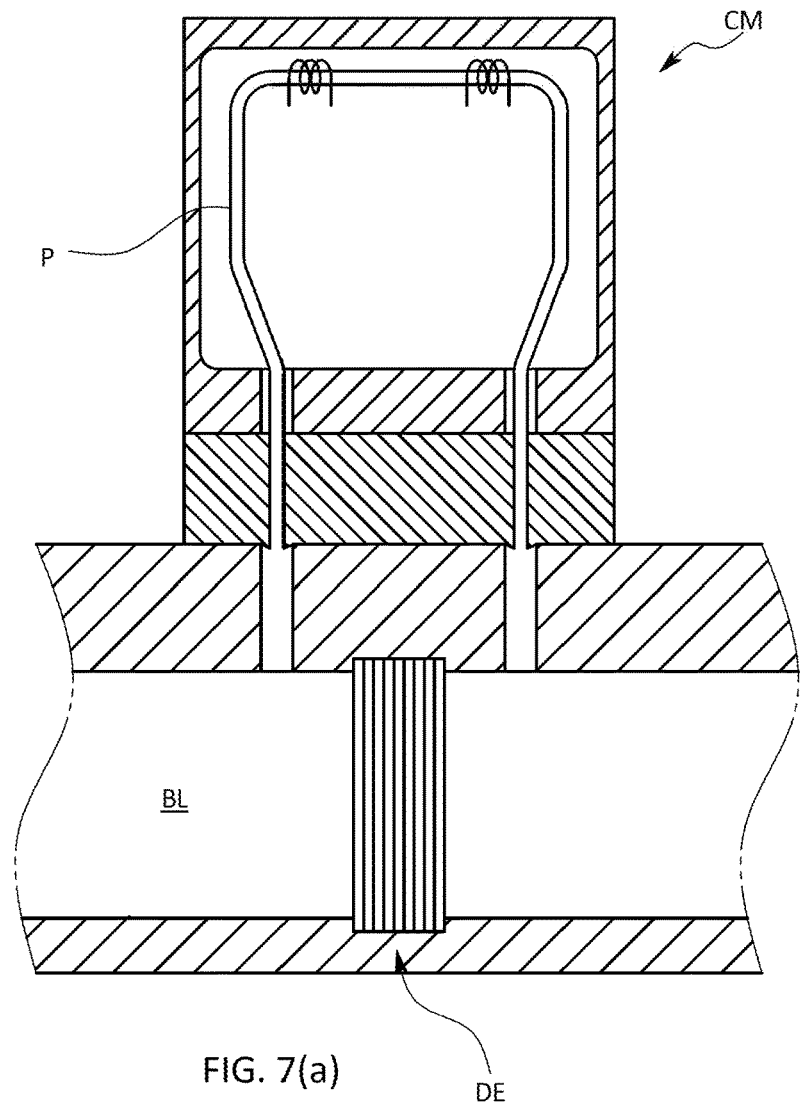
FIGS. 7(a) and 7(b) are schematic views showing a structure of a thermal flow rate sensor.
Figure 7B:
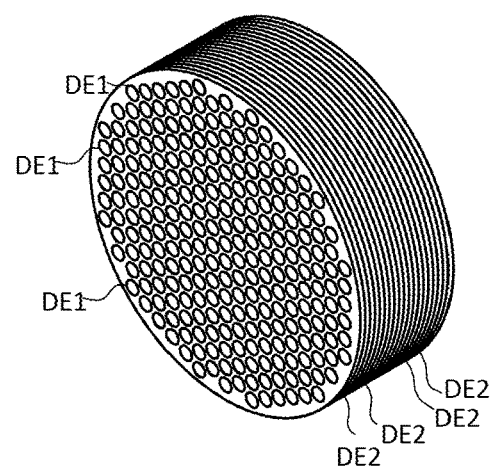

The gas-type correction values will now be described in detail. Various instrument differences exist in the flow rate sensors CM, and proportionally greater flow rate errors that are caused by the gas type are generated as the actual flow rate characteristic function F(x) in the initial state deviates further from the standard flow rate function f(x) and, as is shown in the graph in FIG. 5(a), as an increasingly greater value is set as the sensitivity correction value m. In other words, a diverting element having a high level of accuracy is employed as the diverting element, and when the sensitivity correction values m are small, then it is difficult for flow rate errors to occur even when the gas type is altered. As a result of the intensive investigations performed by the inventors of the present application, it was discovered that, as can be understood from FIG. 5 (a), if the thermal conductivity of the gas type is taken as λ, then the flow rate error that is generated is proportional to $(1/\lambda)-(1/2)$ and, as is shown in FIG. 5(b), the gradient thereof is also proportional to the size of the sensitivity correction values m.

The gas-type correction value calculation unit 51 is based on this knowledge. For example, the gas-type correction value calculation unit 51 calculates a gradient a on an approximate straight line of the flow rate errors at a span value relative to $(1/\lambda)-(1/2)$ in the graph in FIG. 5(a) based on a function of the gradient a(m) created from the data obtained in advance from a plurality of flow rate sensors CM for the sensitivity correction values m (10%) at the time when the sensor output values x are 10%. In addition, the gas-type correction value calculation unit 51 calculates the gas-type correction coefficient k from a formula such as that shown below using the calculated gradient a.

$$k=a(m)\times(1/\lambda)-(1/2)+b$$

Here, λ is the thermal conductivity of the fluid flowing through the flow path, and b is a predetermined intercept. In this example, b is a value that is determined using the fact that, when the thermal conductivity λ of the nitrogen gas, which is a standard gas, is substituted into the formula, then k=0. In this way, the calculated gas type correction coefficient k can be set without any independent actual measurements needing to be made.

According to the correction device 100 that is formed in this way, by adjusting the sensitivity coefficient so as to change the actual flow rate characteristic function F(x) itself which is the subject that is to be matched to the standard flow rate characteristic function f(x), it is possible to improve linearity and then perform span correction.

When this sensitivity coefficient is being adjusted, because respectively different sensitivity adjustment values m are set in accordance with the value of the sensor output values x, even if the flow rate sensor CM is characterized in having markedly poor linearity, a post-sensitivity adjustment actual flow rate characteristic function G(x) to which the standard flow rate characteristic function f(x) can be easily matched can be set.

Accordingly, it is possible to improve the accuracy of the linearity between the sensor output values x and the flow rate values y compared to the conventional technology, and it becomes possible to obtain a post-correction flow rate characteristic function g(x) that substantially matches the post-sensitivity adjustment actual flow rate characteristic function G(x) within a range of 0~100%, which is the standard range, of the sensor output values x. As a result, it is possible, for example, to improve the adjustment yield relating to flow rate characteristics in the overall mass flow controller MFC in which the flow rate sensor CM is incorporated.

Other embodiments will now be described.

The method used to determine the function correction values n is not limited to that described in the present embodiment. It is also possible to decide the function correction values n by employing an algorithm such as the least-squares method or the like. In this case, it is sufficient to obtain and optimize measurement data for at least two sets of sensor output values x and flow rate values y.

The sensitivity correction value function m(x) is not limited to being a quadratic function, and may instead be an even higher order function. Moreover, the sensitivity correction value function m(x) may also be a function that is defined as a step function.

In addition, the sensitivity correction values m are not limited to being multiplied by the initial value, and may instead be added to the initial value. In the same way, the function correction values n are not limited to being multiplied by the standard flow rate characteristic function f(x), and may instead be added thereto. The standard flow rate characteristic function f(x) is not limited to being determined via experiment, as in the above-described embodiment, and may instead be in the form of a theoretical formula or the like.

The flow rate sensor being corrected is not restricted to being the thermal-type sensor described in the embodiment. It is also possible for the correction device and correction method of the above-described embodiment to be used to perform corrections on sensors that are based on other measurement principles.

Furthermore, it should be understood that the present invention is not limited to the above-described embodiment, and that various modifications and the like may be made thereto insofar as they do not depart from the spirit or scope of the present invention.

LIST OF REFERENCE CHARACTERS

100 . . . Correction Device
1 . . . Sensitivity Adjustment Data Storage Unit
21 . . . Correction Function Output Unit
22 . . . Sensitivity Correction Value Function Storage Unit
23 . . . Sensitivity Setting Unit
3 . . . Span Adjustment Data Storage Unit
4 . . . Function Calculation Unit
5 . . . Function Modification Unit
51 . . . Gas-Type Correction Value Calculation Unit
52 . . . Final Output Unit

What is claimed is:

1. A correction device that corrects a flow rate characteristic function for a flow rate sensor that comprises a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, wherein the correction device comprises:

a sensitivity correction value function storage unit that stores a sensitivity correction value function m(x) in which at least a portion of sensitivity correction values m are set to different values in accordance with the sensor output values x output from the flow rate sensor in an initial state in which the sensitivity coefficient is set to an initial value;

a sensitivity setting unit that sets the sensitivity coefficient based on the initial values and on the sensitivity correction value function m(x), and then adjusts the sensitivity of the flow rate sensor;

a coefficient calculation unit that calculates a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x); and a function modification unit that stores either the post-correction flow rate characteristic function g(x) calculated by the function calculation unit or a final flow rate characteristic function h(x) that is based on this post-correction flow rate characteristic function g(x) in the function storage unit as a flow rate characteristic function.

2. The correction device according to claim 1, wherein the sensitivity correction value function m(x) is set such that the sensitivity correction values m become larger as the sensor output values x become smaller.

3. The correction device according to claim 1, further comprising:

a sensitivity adjustment data storage unit that stores a plurality of sets of data for sensitivity adjustment that are made up of sensitivity reference flow rate values F1 for the flow rate of a fluid actually flowing through the flow path, sensor outputs x that are output from the flow rate sensor in an initial state that corresponds to the sensitivity reference flow rate values F1, and pre-sensitivity adjustment flow rate values S1 which are flow rate values y output from the flow rate sensor in the initial state that corresponds to the sensitivity reference flow rate values F1; and a correction function output unit that, based on the plurality of sets of data for sensitivity adjustment, calculates sensitivity correction values m that correspond to each sensor output x in accordance with a difference between the sensitivity reference flow rate values F1 and the flow rate values y, and calculates the sensitivity correction value function m(x) from the plurality of sets of sensor outputs x and sensitivity correction values m, and causes these to be stored in the sensitivity correction value function storage unit.

4. The correction device according to claim 1, further comprising a span adjustment data storage unit that stores data for span adjustment that is made up of span reference flow rate values F2 for the flow rate of a fluid actually flowing through the flow path, and the flow rate values y output from the flow rate sensor whose sensitivity has been corrected using the sensitivity correction value function m(x), wherein the function calculation unit is formed so as to calculate the post-correction flow rate characteristic function g(x), based on the span adjustment data, by taking a value obtained by dividing the span reference flow rate values F2 by the flow rate values y as the function correction value n, and then multiplying this by the standard flow rate characteristic function f(x).

5. The correction device according to claim 4, wherein the span reference flow rate values F2 are values for the span of the flow rate values y that are set in the flow rate sensor.

6. The correction device according to claim 1, wherein the function modification unit comprises:

a gas-type correction value calculation unit that calculates a gas-type correction coefficient k based on a thermal conductivity λ of a fluid, and on the sensitivity correction values m in predetermined sensor output values x; and a final output unit that calculates the final flow rate characteristic function h(x) by multiplying the gas-type correction coefficient k by the post-correction flow rate characteristic function g(x), and then causes this final flow rate characteristic function h(x) to be stored in the function storage unit.

7. The correction device according to claim 6, wherein the gas-type correction value calculation unit calculates a gradient a(m) which is a function of the sensitivity correction values m in predetermined sensor output values x, and then calculates the gas-type correction coefficient k based on the following formula:

$$k = a(m) \times (1/\lambda) - (1/2) + b$$

wherein λ is a thermal conductivity of a fluid flowing through the flow path, and b is a predetermined intercept.

8. A flow rate sensor that is formed so as to output flow rate values y based on the final flow rate characteristic function h(x) stored by the correction device according to claim 1.

9. A flow rate control device comprising the flow rate sensor according to claim 8.

10. A non-transitory program recording medium on which is recorded a program for a correction device that corrects a flow rate characteristic function for a flow rate sensor, the correction device comprising a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, wherein the program for the correction device causes a computer to:

store a sensitivity correction value function m(x) in which at least a portion of sensitivity correction values m are set to different values in accordance with the sensor output values x output from the flow rate sensor in an initial state in which the sensitivity coefficient is set to an initial value;

set the sensitivity coefficient based on the initial values and on the sensitivity correction value function m(x), and then adjust the sensitivity of the flow rate sensor;

calculate a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x); and store either the post-correction flow rate characteristic function g(x) calculated by the function calculation unit or a final flow rate characteristic function h(x) that is based on this post-correction flow rate characteristic function g(x) in the function storage unit as a flow rate characteristic function.

11. A correction method that is employed in order to correct a flow rate characteristic function for a flow rate sensor that comprises a sensor mechanism that outputs an output signal in accordance with a flow rate of a fluid flowing through a flow path, a sensor output calculation unit that calculates sensor output values x based on values indicated by the output signal and on a sensitivity coefficient, a function storage unit that stores a flow rate characteristic function whose inputs are the sensor output values x and whose outputs are flow rate values y, and a flow rate calculation unit that calculates the flow rate values y based on the sensor output values x calculated by the sensor output calculation unit and on the flow rate characteristic function, wherein the correction method comprises steps of:

storing a sensitivity correction value function m(x) in which at least a portion of sensitivity correction values m are set to different values in accordance with the sensor output values x output from the flow rate sensor in an initial state in which the sensitivity coefficient is set to an initial value;

setting the sensitivity coefficient based on the initial values and on the sensitivity correction value function m(x), and then adjusting the sensitivity of the flow rate sensor;

calculating a post-correction flow rate characteristic function g(x) based on function correction values n that are decided in accordance with the flow rate values y output from the flow rate sensor whose sensitivity has been corrected using the sensitivity correction value function m(x), and on a standard flow rate characteristic function f(x); and storing either the post-correction flow rate characteristic function g(x) calculated by the function calculation unit or a final flow rate characteristic function h(x) that is based on this post-correction flow rate characteristic function g(x) in the function storage unit as a flow rate characteristic function.

* * * * *

UNITED STATES PATENT AND TRADEMARK OFFICE
CERTIFICATE OF CORRECTION

PATENT NO. : 11,644,354 B2
APPLICATION NO. : 16/915534
DATED : May 9, 2023
INVENTOR(S) : Hiroyuki Okano It is certified that error appears in the above-identified patent and that said Letters Patent is hereby corrected as shown below:

In the Specification

In Column 5, Line 51, delete "–" and insert --^-- in the equation and;

In Column 13, Line 17, delete "–" and insert --^-- and;

In Column 13, Line 24, delete "–" and insert --^-- and;

In Column 13, Line 33, delete "–" and insert --^-- in the equation.

In the Claims

In Column 16, Line 21, Claim 7, delete "–" and add --^-- in the equation.

Signed and Sealed this
Fifth Day of September, 2023

Katherine Kelly Vidal
*Director of the United States Patent and Trademark Office*